(12) United States Patent
Kim et al.

(10) Patent No.: US 9,881,603 B2
(45) Date of Patent: Jan. 30, 2018

(54) EMOTIONAL-SPEECH SYNTHESIZING DEVICE, METHOD OF OPERATING THE SAME AND MOBILE TERMINAL INCLUDING THE SAME

(71) Applicant: LG ELECTRONICS INC., Seoul (KR)

(72) Inventors: Jaemin Kim, Seoul (KR); Jongyeol Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/110,034

(22) PCT Filed: Sep. 18, 2014

(86) PCT No.: PCT/KR2014/008711
§ 371 (c)(1),
(2) Date: Jul. 6, 2016

(87) PCT Pub. No.: WO2015/111818
PCT Pub. Date: Jul. 30, 2015

(65) Prior Publication Data
US 2016/0329043 A1   Nov. 10, 2016

(30) Foreign Application Priority Data

Jan. 21, 2014 (KR) .......................... 10-2014-0007381

(51) Int. Cl.
*G10L 15/00* (2013.01)
*G10L 13/00* (2006.01)
(Continued)

(52) U.S. Cl.
CPC .............. *G10L 13/10* (2013.01); *G06F 3/167* (2013.01); *G10L 13/02* (2013.01);
(Continued)

(58) Field of Classification Search
None
See application file for complete search history.

(56) References Cited

U.S. PATENT DOCUMENTS 7,401,020 B2 * 7/2008 Eide .................. G10L 13/10
704/258
7,983,910 B2 * 7/2011 Subramanian ...... G10L 19/0018
704/250

(Continued)

FOREIGN PATENT DOCUMENTS

EP   1 071 073 A2   1/2001

*Primary Examiner* — Fariba Sirjani
(74) *Attorney, Agent, or Firm* — Birch, Stewart, Kolasch & Birch, LLP (57) ABSTRACT

Provided is an emotional-speech synthesizing device including: a sentence recognition unit that recognizes a sentence that is input; a word emotion determination unit that calculates probability vector of an emotion that is pre-defined for each word that makes up the recognized sentence and estimates the emotion and a rhythm based on the probability vector; and an emotional-speech synthesizing unit. The emotional-speech synthesizing unit calculates in stages degrees of similarity in the emotion and the rhythm between the adjacent words based on context information on the recognized sentence, applies weight to a phoneme candidate corresponding to the each word based on the degrees of the similarity and the probability vector, selects the phoneme candidate that has a minimum target pitch, minimum duration time, a minimum distance value of a target pitch contour, and thus synthesizes an emotional speech that corresponds to the recognized sentence in optimal units.

5 Claims, 4 Drawing Sheets (51) Int. Cl.
 *G10L 25/00* (2013.01)
 *G10L 13/10* (2013.01)
 *G10L 13/02* (2013.01)
 *G06F 3/16* (2006.01)
 *G10L 13/033* (2013.01)
 *G10L 13/07* (2013.01)

(52) U.S. Cl.
 CPC ......... *G10L 13/0335* (2013.01); *G10L 13/07* (2013.01); *G10L 2013/105* (2013.01)

(56) References Cited

U.S. PATENT DOCUMENTS

| | | | | |
|---|---|---|---|---|
| 8,682,649 | B2 * | 3/2014 | Bellegarda | G06F 17/2785 704/10 |
| 2002/0198717 | A1 * | 12/2002 | Oudeyer | G10L 13/00 704/270 |
| 2003/0163320 | A1 * | 8/2003 | Yamazaki | G10L 13/10 704/270 |
| 2004/0019484 | A1 | 1/2004 | Kobayashi et al. | |
| 2005/0060158 | A1 * | 3/2005 | Endo | G10L 17/26 704/275 |
| 2005/0071163 | A1 * | 3/2005 | Aaron | G10L 13/10 704/260 |
| 2005/0240412 | A1 | 10/2005 | Fujita | |
| 2009/0063154 | A1 * | 3/2009 | Gusikhin | B60W 50/10 704/260 |
| 2009/0157409 | A1 * | 6/2009 | Lifu | G10L 13/08 704/260 |
| 2010/0299149 | A1 * | 11/2010 | Kurzweil | G10L 13/043 704/260 |
| 2011/0112825 | A1 * | 5/2011 | Bellegarda | G06F 17/2785 704/9 |
| 2011/0208522 | A1 * | 8/2011 | Pereg | G06F 17/279 704/235 |
| 2013/0054244 | A1 * | 2/2013 | Bao | G10L 13/10 704/260 |
| 2013/0262096 | A1 * | 10/2013 | Wilhelms-Tricarico | G10L 25/90 704/202 |
| 2014/0025382 | A1 * | 1/2014 | Chen | G10L 13/02 704/260 |
| 2014/0114886 | A1 * | 4/2014 | Mays | G06Q 30/02 706/12 |
| 2015/0058019 | A1 * | 2/2015 | Chen | G10L 13/10 704/260 |
| 2016/0300564 | A1 * | 10/2016 | Nasu | G10L 13/06 |
| 2016/0321243 | A1 * | 11/2016 | Walia | G06F 17/271 |

\* cited by examiner

EMOTIONAL-SPEECH SYNTHESIZING DEVICE, METHOD OF OPERATING THE SAME AND MOBILE TERMINAL INCLUDING THE SAME

CROSS REFERANCE TO RELATED APPICATIONS

This application is the National Phase of PCT International Application No. PCT/KR2014/008711, filed on Sep. 18, 2014, which claims priority under 35 U.S.C. 119(a) to Patent Application No. 10-2014-0007381, filed in The Republic of Korea on Jan. 21, 2014, all of which are hereby expressly incorporated by reference into the present application.

TECHNICAL FIELD

The present disclosure relates to an emotional-speech device that is capable of synthesizing a speech in which various emotion are expressed, a method of operating the emotional-speech device, and a mobile terminal including the emotional-speech device.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

On the other hand, a function of synthesizing a speech in which various human emotions are expressed has been realized in the mobile terminal. With device developments, a synthesizing technology for ever-increasing synthesizing capacity has evolved to provide a distinctively synthesized speech that is not possible with a synthesizing technology for small synthesizing capacity in the related art. In addition, the synthesizing technology that enables user's emotions to be variously expressed in various environments has evolved according to a user's need.

However, in the related art, one sentence is speech-synthesized expressing one emotion, or a sentence is speech-synthesized expressing an emotion of a specific word in the sentence in an uniform manner. Thus, the user' emotions cannot be variously expressed in a natural manner.

DISCLOSURE OF INVENTION

Solution to Problem

Therefore, an aspect of the detailed description is to provide an emotional-speech synthesizing device, a method of operating the emotional-speech synthesizing device, and a mobile terminal including the emotional-speech synthesizing device, all of which are capable of calculating probability vector of an emotion that is pre-defined for each word, not for a sentence, of applying weight to selectable phoneme candidates based on the calculated probability vector and context information on the sentence, and thus of synthesizing an emotional speech in optimal units.

To achieve these and other advantages and in accordance with the purpose of this specification, as embodied and broadly described herein, there is provided a According to an aspect of the present invention, there is provided an emotional-speech synthesizing device including: a sentence recognition unit that is configured to recognize a sentence that is input; a word emotion determination unit that is configured to calculate probability vector of an emotion that is pre-defined for each word that makes up the recognized sentence and to estimate the emotion and a rhythm of the each word, based on the probability vector; and an emotional-speech synthesizing unit that is configured to calculate in stages degrees of similarity in the emotion and the rhythm between the adjacent words based on context information on the recognized sentence, to apply weight to a phoneme candidate corresponding to the each word based on the degrees of the similarity and the probability vector, to select the phoneme candidate that has a minimum target pitch, minimum duration time, a minimum distance value of a target pitch contour, and thus to synthesize an emotional speech that corresponds to the recognized sentence in optimal units.

The emotional-speech synthesizing device may further include a sound output unit that is configured to the emotional speech that is synthesized by the emotional-speech synthesizing unit.

The emotional-speech synthesizing may further include a phoneme conversion unit that is configured to analyze the recognized sentence and convert the recognized sentence into phonemes according to a linguistic feature, in which the word emotion determination unit may calculate the probability vector of the emotion that is pre-defined for the each word that makes up the sentence that is converted into the phonemes.

In the emotional-speech synthesizing device, when calculating the probability vector, the word emotion determination unit may apply weight of the probability vector of the emotion of the each word that is used in a real environment.

In the emotional-speech synthesizing device, the word emotion determination unit may perform updating to reflect a result of learning that is obtained through the repeated calculations of the probability vector.

In the emotional-speech synthesizing, based on the context information on the recognized sentence, the word emotion determination unit may calculate a final value of the probability vector.

In the emotional-speech synthesizing device, when estimating a rhythm of the each word, based on the context information on the recognized sentence, the word emotion determination unit may include a context information field for generating one integration rhythm model.

The emotional-speech synthesizing device may further include an emotion word dictionary unit in which the each word is classified as an entry having at least multiple pre-defined emotions and the categorized words is stored as entries to create an emotion word dictionary.

To achieve these and other advantages and in accordance with the purpose of this specification, as embodied and broadly described herein, there is provided a method of operating an emotional-speech synthesizing device, including: recognizing a sentence that is input; calculating probability vector of an emotion that is pre-defined for each word that makes up the recognized sentence; estimating the emotion and a rhythm based on the probability vector; calculating in stages degrees of similarity in the emotion and the rhythm between the adjacent words based on context information on the recognized sentence and applying weight to a phoneme candidate corresponding to the each word based on the degrees of the similarity and the probability vector; and selecting the phoneme candidate that has a minimum target pitch, minimum duration time, a minimum distance value of a target pitch contour, and thus synthesizing an emotional speech that corresponds to the recognized sentence in optimal units.

The method may further include outputting the synthesized emotional speech.

In the method, the recognizing of the sentence that is input may include analyzing the recognized sentence and converting the recognized sentence into phonemes according to a linguistic feature.

In the method, in the calculating of the probability vector, when calculating the probability vector, weight of the probability vector of the emotion of the each word that is used in a real environment may be applied.

To achieve these and other advantages and in accordance with the purpose of this specification, as embodied and broadly described herein, there is provided a mobile terminal including: an input unit that is configured in such a manner that a control command for outputting an emotional speech to the input unit; a controller that is configured to recognize at least one sentence that is input, based on the control command, to calculate probability vector of an emotion that is pre-defined for each word that makes up the recognized sentence, to estimate the emotion and a rhythm of the each word, based on the probability vector, to calculate in stages degrees of similarity in the emotion and the rhythm between the adjacent words based on context information on the recognized sentence, to apply weight to a phoneme candidate corresponding to the each word based on the degrees of the similarity and the probability vector, to select the phoneme candidate that has a minimum target pitch, minimum duration time, a minimum distance value of a target pitch contour, and thus to synthesize an emotional speech that corresponds to the recognized sentence in optimal units and a sound output unit that is configured to output the emotional speech that is synthesized by the controller.

In the mobile terminal, the controller may convert the recognized sentence into text and outputs the text-converted sentence to a display unit at the same speed as does the emotional speech.

In the mobile terminal, the controller further may include a phoneme conversion module that analyzes the recognized sentence and converts the recognized sentence into phonemes according to a linguistic feature, and a context information module that generates one integration rhythm model based on the context information on the recognized sentence when estimating the rhythm of the each word.

In the mobile terminal, when calculating the probability vector, the controller may apply weight of the probability vector of the emotion of the each word that is used in a real environment.

In the mobile terminal, the controller may perform updating to reflect a result of learning that is obtained through the repeated calculations of the probability vector.

In the mobile terminal, based on the context information on the recognized sentence, the controller may calculate a final value of the probability vector.

In the mobile terminal, the context information may include at least one or more among sentence division-reading information, part-of-speech information, and sentence structure information.

The mobile terminal may further include a memory in which the each word is classified as an entry having at least multiple pre-defined emotions and the categorized words as entries is stored to create an emotion word dictionary.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Advantageous Effects of Invention

As described above, the emotional-speech synthesizing device according to the embodiment of the present invention, the method of operating the emotional-speech synthesizing device, and the mobile terminal including the emotional-speech synthesizing device can calculate the probability vector of the emotion that is pre-defined for each of the words, not for the sentence, applies the weight to the selectable phoneme candidates based on the calculated probability vector and the context information on the sentence, and selects the phoneme that has the minimum target pitch, the minimum duration time, and the minimum distance value of the target pitch contour, and thus can synthesize the emotional speech in optimal units. Accordingly, it is possible to express the speech that expresses naturally the various emotions contained in one sentence.

BRIEF DESCRIPTION OF DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
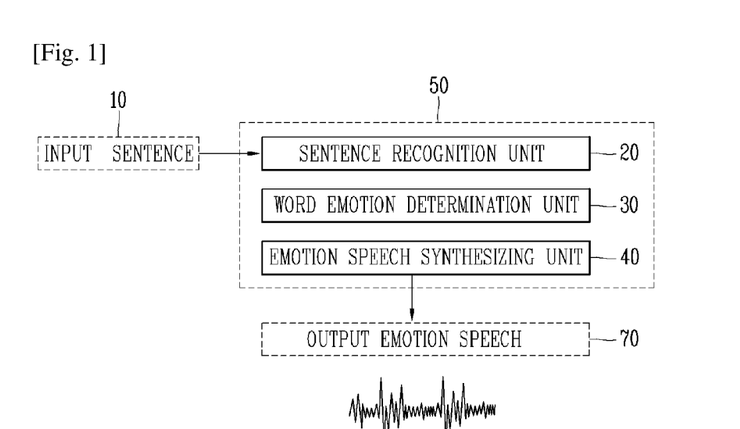
FIG. 1 is a block diagram illustrating an outline configuration of an emotional-speech synthesizing device according to the present invention.

FIG. 1 is a block diagram illustrating an outline configuration of an emotional-speech synthesizing device according to the present invention. Referring to FIG. 1, an emotional-speech synthesizing device 50 according to the embodiment of the present invention, as illustrated in FIG. 1, is configured to include a sentence recognition unit 20, a word-based emotion determination unit 30, and an emotional-speech synthesizing unit 40. In addition, FIG. 2 illustrates a specific configuration of the word-based emotion determination unit 30 that determines an emotional meaning of each word that makes up a sentence and an emotion word database 60 in connection.

In the related art, speech synthesizing that expresses one emotion is performed on one sentence. For example, assume that a sentence "I am sorry for that, but every cloud has a silver line and cheer up!" is speech-synthesized using a text-to-speech (TTS) engine. At this point, synthesized speech that is output expresses only one emotion, "courage", but does not naturally express various implicit emotions contained in the sentence. However, according to an embodiment of the present invention, proper emotions implicitly contained in one sentence are expressed based on a word, a phrase, a clause, or an expression that makes up the one sentence. For example, in the sentence described above, a clause "I am sorry for that" is speech-synthesized expressing an emotion, "sad," a clause "everything has a silver line" is speech-synthesized expressing an emotion, "hope," and a clause "cheer up!" is speech-synthesized expressing "courage." As a result, the sentence is speech-synthesized and is output in such a manner that the emotions implicitly contained in the components of the sentence are successively expressed.

Figure 2:
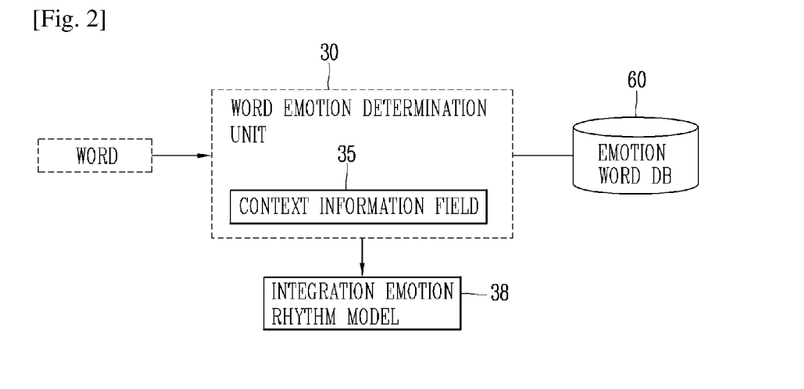
FIG. 2 is a block diagram for describing processing that determines an emotional meaning of each word that makes up a sentence, which is performed by the emotional-speech synthesizing device according to the present invention.

Specific functions and operations in a configuration illustrated in each of FIGS. 1 and 2 are described in detail below.

On the other hand, although not illustrated, the emotional-speech synthesizing device 50 transmits and receives data to and from a client device, such as a computer, a smart phone, or the like, over a network. and can be accordingly realized as a server that provides emotional a speech synthesizing service. In addition, the emotional-speech synthesizing device 50 is realized as an electronic device that includes the constituent elements described above, for example a mobile terminal to be described below.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 3A:
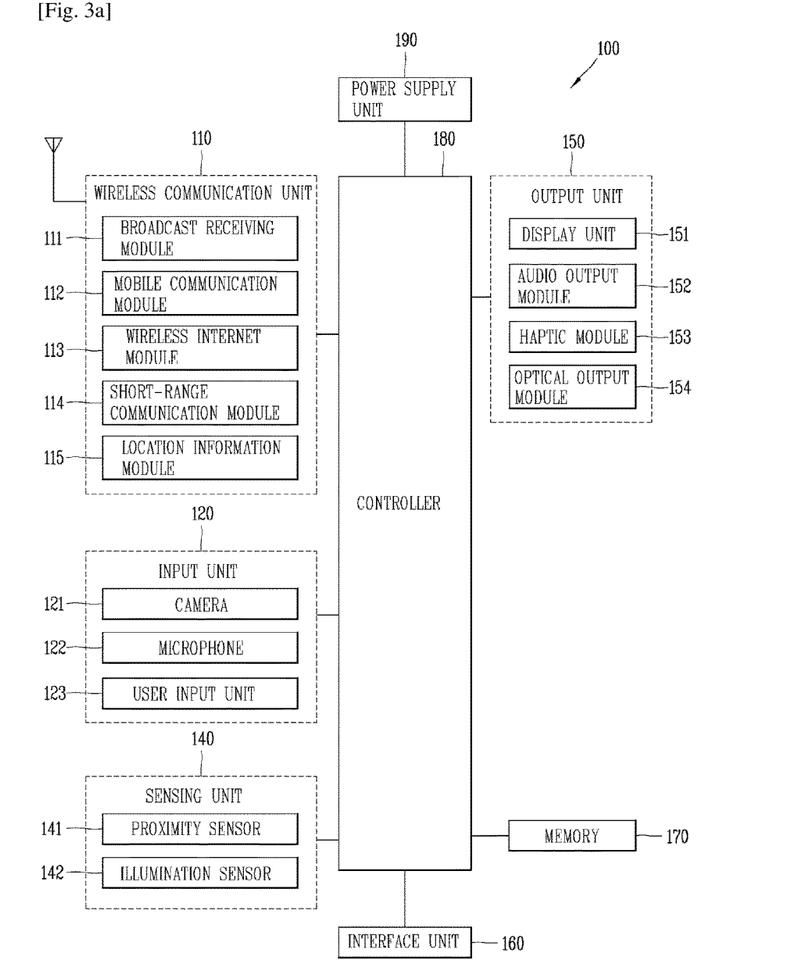
FIG. 3A is a block diagram for describing a mobile terminal that is capable of performing emotional-speech synthesizing, according to an embodiment of the present invention.
Figure 3B:
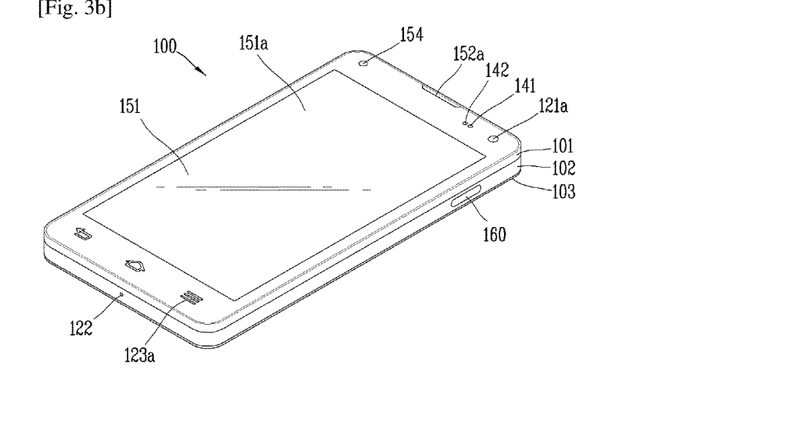
FIGS. 3B and 3C are diagrams of the mobile terminal that is capable of performing the emotional-speech synthesizing, according to the embodiment of the present invention, when viewed from different directions.
Figure 3C:
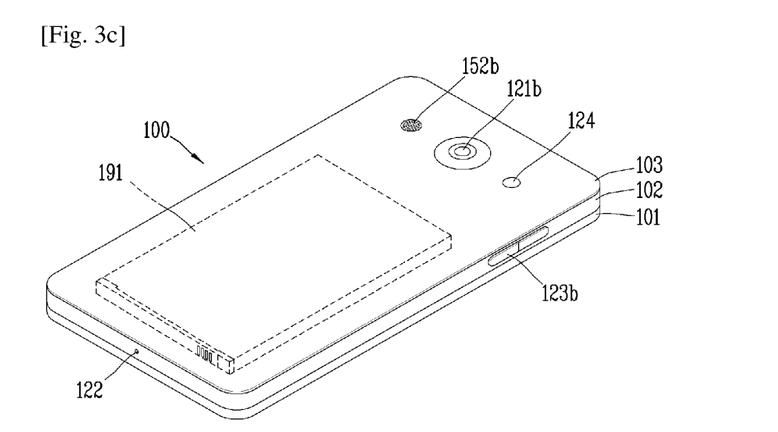

FIG. 3A is a block diagram for describing the mobile terminal that is capable of performing the emotional-speech synthesizing according to an embodiment of the present invention, and FIGS. 3B and 3C are conceptual views of one example of the mobile terminal viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 3A is not a requirement, and that greater or fewer components may alternatively be implemented.

Referring now to FIG. 3A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 3A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 3A, or activating application programs stored in the memory 170. As one example, the controller 180 controls some or all of the components illustrated in FIGS. 3A-3C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 3A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 3B and 3C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a unibody is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 3B and 3C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 3A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 3B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3C, a flash 124 is shown adjacent to the second camera 121b. When an image of a subject is captured with the camera 121b, the flash 124 may illuminate the subject.

As shown in FIG. 3B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a communication system which is operable with the display device 100 according to the present disclosure will be described.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omnidirectional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 3A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

Referring back to FIG. 1, when a sentence is input (10), the emotional-speech synthesizing device 50 according to the embodiment of the present invention recognizes the sentence that is input, through the sentence recognition unit 20.

In addition, the emotional-speech synthesizing device 50, although not illustrated, analyzes the sentence that is recognized through the sentence recognition unit 20 and is converted into phonemes according to a linguistic feature. Then, each phonemeconverted word is output to the word emotion determination unit 30.

Then, the word emotion determination unit 30 determines a probability vector of an emotion that is pre-defined for each of the words that make up the recognized sentence, and estimates an emotion and a rhythm of each of the words that make up the sentence, based on the probability vector.

In addition, the word emotion determination unit 30 may apply weight of the probability vector of the emotion for a word that is in a real environment. Equation 1 that follows is a function that shows a method of calculating a probability vector that reflects an actual emotion environment in this manner.

$$Pe_i(x)=W_i(x)Pdb_i(x) \qquad \text{Equation 1}$$

where $Pe_i$ is a probability vector value, x is a word that is input, i=1 to n, and n is the number of emotions of a word. In addition, $Pdb_i$ is a probability vector of the $i^{th}$ emotion of word x in a database (DB) environment, and $W_i$ is weight of a probability vector of the $i^{th}$ emotion of word x in a real environment.

In addition, when calculating the probability vector, the word emotion determination unit 30 performs updating to reflect a result of learning that is obtained through repeated calculations of the probability vector. Accordingly, the word emotion determination unit 30 estimates different emotions of the same word according to a point in time where the probability vector is calculated.

In addition, based on context information on the sentence that is recognized through the sentence recognition unit 20, the word emotion determination unit 30 adjusts a final value of the probability vector. At this point, the context information includes at least one or more among sentence division-reading information, part-of-speech information, and sentence structure information. Equation that follows is a function for obtaining the final value of the probability vector that is readjusted based on the context information on the sentence in this manner.

$$Pem_i(x)=f(Pe_i(x)) \qquad \text{Equation 2}$$

where $Pem_i$ is a final value of the adjusted probability vector, $Pe_i$ is an estimated value, and f( ) is a probability adjustment function that uses the context information on the sentence.

On the other hand, FIG. 2 is a block diagram for describing processing that determines the emotion of each of the words that make up the sentence, which is performed by the word emotion determination unit 30 of the emotional-speech synthesizing device according to the present invention. Referring to FIG. 2, as a result of calculating the probability vector of the emotion that is pre-defined for each of the words that make up the sentence, a corresponding emotion word is provided from an emotion word database 60 (hereinafter referred to as an "emotion word dictionary unit," or a "memory") to the word emotion determination unit 30.

The emotion word database 60 stores the emotion word dictionary in which words are classified as entries, each having multiple pre-defined emotions.

The emotion is a conscious experience characterized primarily by psychological expressions in response to a stimulus and are divided into surprise, honor loathing, rage, delight, happiness, grief, and the like. However, the same stimulus arouses different emotions in different levels of emotional strength among people. Reflecting this feature, the emotion word database 60 groups words according to emotion classes and determines and stores a similarity between the corresponding word and the emotion class, positivity/negativity of each emotion class, and a strength level of each emotion class. At this point, the emotion classes result from classifying the human emotional states, such as delight, sadness, satisfaction, yearning, happiness and the like. The number of the emotional classes is only one example that shows how many types of the emotions the words are grouped into, and the present invention is not limited to this number. In addition, the similarity indicates how the corresponding word is similar to the emotional class. In addition, the strength level of the emotion class indicates how strong the emotion of the corresponding word. The similarity and the level of the emotional strength are expressed as a range of numerical values.

In addition, as illustrated in FIG. 2, the word emotion determination unit 30 includes a context information field 35 inside. Accordingly, when estimating the rhythm of each word, the word emotion determination unit 30 generates one integration rhythm model, based on the context information on the recognized sentence. At this point, the generating of one integration rhythm model means that one integration rhythm is estimated based on the context information on the sentence without estimating a separate rhythm for the determined emotion of each word.

Referring back to FIG. 1, the emotional-speech synthesizing unit 40 calculates degrees of the similarity in the emotion and the rhythm between the adjacent words, in stages, based on the context information on the sentence. Accordingly, the estimated emotion of each word is reflected to the maximum in such a manner that connections between the words are naturally realized.

In addition, the emotional-speech synthesizing unit 40 assigns different weight to phoneme candidates corresponding to each word, based on the degrees of the similarity in the emotion and the rhythm between the adjacent words and on the probability vector calculated by the word emotion determination unit 30. For example, a Korean word "사랑" consists of phonemes "ㅅ," "ㅏ," "ㄹ," "ㅏ," and "o" and the phoneme candidates are present that have different emotions for each phoneme. In this case, the emotional-speech synthesizing unit 40 assigns weight to the phoneme candidates that have different emotions for each phoneme, based on the emotion determined by the word emotion determination unit 30, adjacent words and context of the entire sentence.

Then, from among the phonemes to which the weight is assigned, the emotional-speech synthesizing unit 40 selects a phoneme candidate that has a minimum target pitch, minimum duration time, and a minimum distance value of a target pitch contour.

Then, the emotional-speech synthesizing unit 40 synthesizes emotional speech corresponding to the recognized sentence, in optimal units.

The emotional speech that is synthesized in this manner is output through an outputting unit 70 that is provided within the emotional-speech synthesizing device or is separately provided outside.

As described above, the emotional-speech synthesizing device according to the embodiment of the present invention can synthesize and output a speech in which various emotions included in one sentence are naturally expressed.

Figure 4:
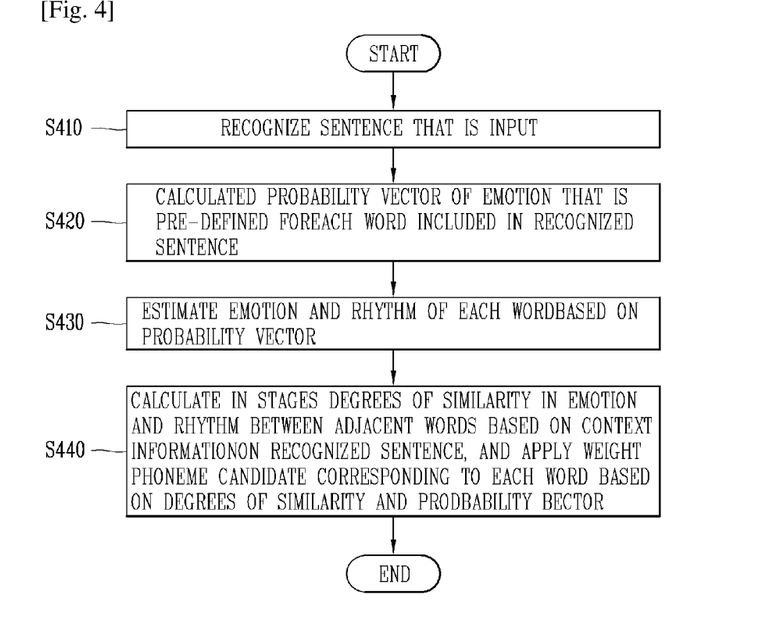
FIG. 4 is a flow chart for describing a method of operating the emotional-speech synthesizing device according to the embodiment of the present invention.

A flow chart of a method of operating the emotional-speech synthesizing device according to the embodiment of the present invention is described below referring to FIG. 4.

First, the emotional-speech synthesizing device 50 (refer to FIG. 1) according to the embodiment of the present invention proceeds a step of recognizing a sentence that is input (S410).

Subsequently, the probability vector of the emotion that is pre-defined for each of the words that make up the recognized sentences (S420).

Subsequently, a step of estimating the emotion and rhythm of each of the words that make up the sentence based on the calculated probability vector (S430).

When the emotion and the rhythm of each of the words are estimated, the degrees of the similarity in the emotion and the rhythm between the adjacent words are calculated in stages, and the weight is applied to the phoneme candidates corresponding to each of the words based on the degrees of the similarity and the calculated probability vector (S440).

Then, the phoneme candidate that has the minimum target pitch, the minimum duration time, and the minimum distance value of the target pitch contour is selected from among the phoneme candidates to which the weight is applied, and the emotional speech corresponding to the recognized sentence is synthesized in optimal units (S450).

An example of processing that estimates the emotion and the rhythm of each of the words that make up the sentence is described in detail below.

Figure 5:
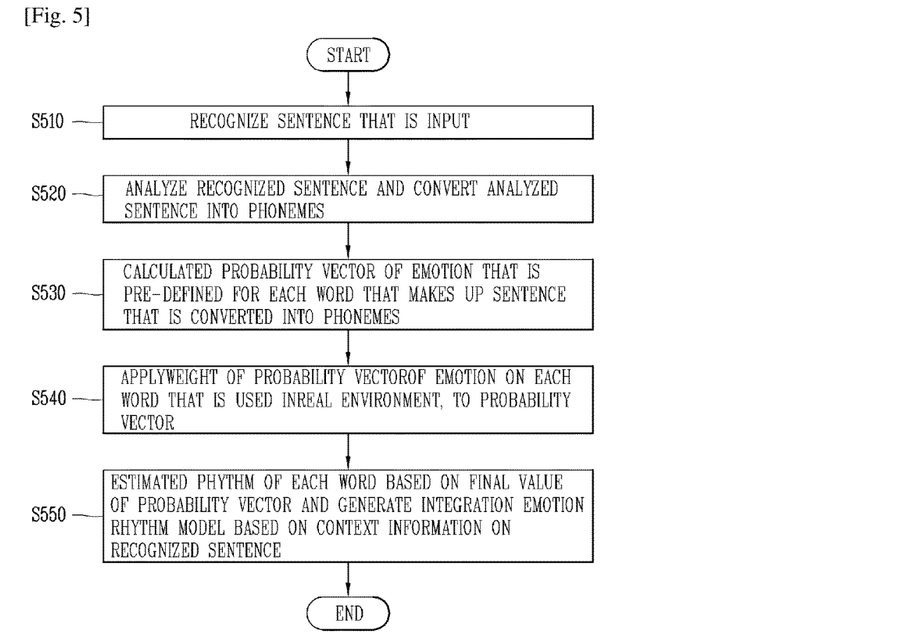
FIG. 5 is a flow chart for describing a method of determining an emotion of each of the words and thus generating an integration emotion rhythm model, according to the embodiment of the present invention.

In association with this, FIG. 5 is a flow chart for describing a method of determining the emotion of each of the words and thus generating an integration emotion rhythm model, according to the embodiment of the present invention.

First, proceeding to a step of recognizing the sentence that is input takes place (S510). Then, the recognized sentence is analyzed and is converted into phonemes is performed according to linguistic feature (S520).

That is, a phoneme conversion unit (not illustrated) converts the recognized sentence into defined phonemes according to the linguistic feature that is analyzed through syntax analysis of the sentence. At this point, for example, the linguistic feature is defined as the order in which parts of speech are arranged to make a sentence. For example, in the Korean language, there are parts of speech, such as a noun, a pronoun, a numeral, a post-positional word, a pre-noun, an verb, an adjective, an adverb, an auxiliary, post-positional word. In addition, all languages, such as English, Japanese, French, and Chinese, have their respective distinctive feature. In addition, a morpheme is the smallest grammatical unit in a language, and the sentence is analyzed in terms of a morpheme.

For example, a Korean sentence "나랑 내일 만나자" consists of morphemes "나," "랑," "내일," and "만나자" The sentence is divided into morphemes and then, components of the sentence are analyzed in terms of parts of speech sentence. For example, "나" is analyzed as a pronoun, and "내일" as a noun.

In addition, the phoneme conversion unit (not illustrated) converts the sentenced into optimal phonemes depending on a feature of the sentence. At this point, when connecting the optimal phonemes and synthesizing the speech, the length and pitch of the speech are controlled, At this point, the feature of the sentence means a rule, such as a prolonged sound rule and palatalization, which is applied when pronouncing a sentence, that is, a linguistic rule that a phonetic symbol should differ from a representative symbol expressed by a letter.

Then, the probability vector of the emotion of each of the words that make up the sentence, which is converted into phonemes, is calculated (S530). In addition, the weight of the probability vector of the emotion of each of the words that are used in a real environment is applied, and a final value of the probability vector is adjusted based on the context information on the recognized sentence (S540).

Subsequently, the rhythm of each of the words is estimated based on the final value of the probability vector and one integration emotion rhythm model is generated based on the context information on the recognized sentence (S550). Because of this, the probability vector of the emotion is calculated based on each of the words, not a sentence unit, and thus it is possible to estimate the natural emotion and rhythm of each of the words by considering the context information on the recognized sentence.

Each of the words has various rhythms. At this point, the rhythm refers to an intonation or an accent other than vocal sound information that carries spoken contents in the speech and is controlled by a sound volume (energy), a sound amplitude (frequency), and a sound wavelength (duration time). That is, the rhythm according to the embodiment of the present invention means a signal feature in terms of phonetic changes in pitch, a voice volume, a syllable length (duration time), and the like.

For example, Korean tones and break indices (ToBI), which a set of conventions for transcribing and annotating the prosody of speech, is used for rhythm modelling. In Korean ToBI, there are various tones and boundary tones. However, according to the embodiment of the present invention, for simplicity, 4 boundary tones L %, H %, HL %, and LH % of an Intonation phase, 2 boundary tones La and Ha of an Accentual Phrase, 3 rhythm boundaries B0 (no boundary), B2 (small rhythm boundary) and B3 (large rhythm boundary). At this point, because the rhythm boundary forms a rhythm structure of a sentence, if the rhythm boundary is estimated in error, an original meaning of the sentence may be changed. Thus, the rhythm boundary plays an important role in the TTS system.

Subsequently, an example of processing that synthesizes the emotional speech in optimal units, based on the context information and the sentence and the probability vector of the emotion is described in detail below.

Figure 6:
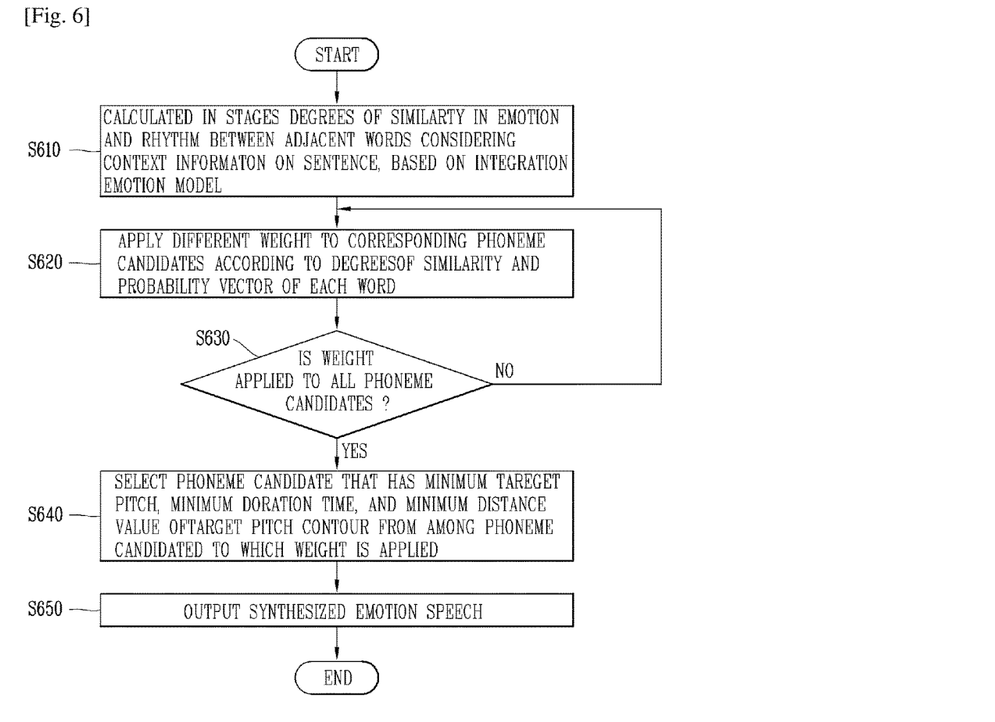
FIG. 6 is a flow chart for describing a method of selecting phoneme candidates to synthesize based on context information on a sentence and probability vector of the emotion, according to the embodiment of the present invention.

In association with this, FIG. 6 is a flow chart for describing a method of selecting the phoneme candidates to synthesize based on the context information on the sentence and the probability vector of the emotion, according to the embodiment of the present invention.

Processing that calculates in stages the degrees of the similarity in the emotion and the rhythm between the adjacent words by considering the context information on the recognized sentence, based on the generated integration emotion rhythm model (S610).

Subsequently, different weight is assigned to the corresponding phoneme candidates, according to the degrees of the similarity in emotion and the rhythm and the probability vector of the emotion of each of the words (S620). Then, Step S620 is repeatedly performed until the weight is applied to all the phoneme candidates (S630).

Then, the phoneme candidate that has the minimum target pitch, the minimum duration time, and the minimum distance value of the target pitch contour is selected from among the phoneme candidates to which the weight is applied, and the emotional speech corresponding to the recognized sentence is synthesized in optimal units (S640). An optimal synthesizing unit is configured by selecting the phoneme candidate a weighted distance of which is close through a Viterbi search that is based on a cost function.

At this point, the phoneme candidate that has the minimum target pitch, the minimum during time (sound wavelength), and the minimum distance value of the target pitch contour means a phoneme candidate that is close to the probability vector of the estimated emotion and is connected more naturally with the phonemes to synthesize. That is, although various emotion changes are present in the recognized sentence, the phonemes that are naturally connected are selected in such a manner that the various emotion changes do not occur abruptly.

When the emotional speech is synthesized that corresponds to the sentence that is recognized in this manner, the synthesized emotional speech is output (S650).

Because of this, the emotional speech is synthesized by applying the weight to the selectable phoneme candidates based on the calculated probability vector and the context information on the sentence and by selecting the phoneme that has the minimum target pitch, the minimum duration time, and the minimum distance value of the target pitch contour from among the phoneme candidates.

On the other hand, as described above, a technology of synthesizing the emotional-speech synthesizing according to the present invention can be realized in the mobile terminal illustrated in FIGS. 3A to 3C.

To do this, a control command for outputting the emotional speech is input, through an input unit 120 (refer to FIG. 3A), into the mobile terminal 100 (refer to FIG. 3A) according to the present invention. Then, based on the control command that is input, the controller 180 (refer to FIG. 3A) of the mobile terminal 100 recognizes at least one sentence.

At this point, the controller 180 may further include a phoneme conversion module (not illustrated) that analyzes the recognized sentence and converts the recognized sentence into phonemes according to the linguistic feature, and a context information module (not illustrated) that generates one integration rhythm model based on the context information on the recognized sentence when estimating the rhythm of each of the words.

Then, the controller 180 calculates the probability vector of the emotion that is pre-defined for each of the words that make up the recognized sentence. Accordingly, the controller 180 extracts the emotion word corresponding to the calculated probability vector from a memory 170 (refer to FIG. 3A) of the mobile terminal 100. To do this, the memory 170 stores the emotion word dictionary in which each of the words is classified as an entry having at least multiple pre-defined emotions.

In addition, when calculating the probability vector, the controller 180 applies the weight of the probability vector of the emotion of each of the words that are used in a real environment. In addition, when calculating the probability vector, the controller 180 performs updating to reflect the result of learning that is obtained through the repeated calculations of the probability vector. In addition, based on the context information on the recognized sentence, the controller 180 adjusts the final value of the probability vector. At this point, the context information includes at least one or more among the sentence division-reading information, the part-of-speech information, and the sentence structure information.

Subsequently, based on the calculated probability vector, the controller 180 estimates the emotion and rhythm of each of the words that make up the sentence. In addition, based on the context information on the recognized sentence, the controller 180 calculates in stages the degrees of the similarity in the emotion and the rhythm between the adjacent words. Then, based on the degrees of the similarity and the probability vector, the controller 180 applied the weight to the phoneme candidate corresponding to each of the words. Subsequently, the controller 180 selects the phoneme candidate that has the minimum target pitch, the minimum duration time, and the minimum distance value of the target pitch contour from among the phoneme candidates to which the weight is applied. Then, the emotional speech corresponding to the recognized sentence is synthesized in optimal units.

The emotional speech that is synthesized in this manner is output through a sound output unit 152 (refer to FIG. 3A) of the mobile terminal 100.

On the other hand, the controller 180 converts the recognized sentence into text. Then, the controller 180 outputs the sentence that is into text in this manner, to a display unit 151 (refer to FIG. 3A) at the same speed as does the emotional speech.

As described above, the emotional-speech synthesizing device according to the embodiment of the present invention, the method of operating the emotional-speech synthesizing device, and the mobile terminal including the emotional-speech synthesizing device can calculate the probability vector of the emotion that is pre-defined for each of the words, not for the sentence, applies the weight to the selectable phoneme candidates based on the calculated probability vector and the context information on the sentence, and selects the phoneme that has the minimum target pitch, the minimum duration time, and the minimum distance value of the target pitch contour, and thus can synthesize the emotional speech in optimal units. Accordingly, it is possible to express the speech that expresses naturally the various emotions contained in one sentence.

In addition, according to one embodiment of the present invention, the method described above may be realized by being stored as processor-readable codes in a program-stored medium. The computer-readable medium includes all types of recording devices that stores data that is readable by computer systems. A ROM, a RAM, a CD-ROM, a magnetic tape, a floppy disk, an optical data storage device and the like are examples of the computer-readable medium, and the computer-readable medium may be realized in the form of a carrier wave (for example, a transmission over the Internet). In addition, the computer may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for emotional speech synthesizing of a mobile terminal, the method comprising:
receiving, via a controller, a control command for outputting of emotional speech;
recognizing, via the controller, a sentence comprising words that is input;
calculating, via the controller, a probability vector of multiple pre-defined emotions for each of the words that makes up the recognized sentence, the probability vector means a value of frequency of usage of each of the multiple pre- defined emotions for each of the words in a database (DB) environment;
applying, via the controller, a weight of the probability vector of the multiple pre-defined emotions of each of the words that are used in a real environment;
adjusting a final value of the probability vector based on context information on the recognized sentence;
estimating, via the controller, an emotion and a rhythm of each of the words;
generating, via the controller, one integration emotion rhythm model based on the estimated rhythm and the context information, wherein the one integration emotion rhythm model estimates one integration rhythm based on the context information on the recognized sentence without estimating a separate rhythm for the emotion of each word;
calculating, via the controller, in stages degrees of similarity in an emotion and a rhythm between adjacent words of the recognized sentence based on the estimated emotion and the generated integration emotion rhythm model wherein the probability vector of the multiple pre-defined emotions is updated to reflect the result of learning that is obtained through calculations of the probability vector;
applying, via the controller, a different weight to all phoneme candidates corresponding to each of the words based on the degrees of the similarity in the estimated emotion and the estimated rhythm and the final value of the probability vector;
selecting, via the controller, one phoneme candidate having a pitch contour that has a minimum distance value from a target pitch contour, among all the phoneme candidates to which the different weight is applied through a Viterbi search that is based on a cost function; and
synthesizing, via the controller, an emotional speech that corresponds to the recognized sentence in optimal units by connecting the selected phoneme candidate for each of the words;
outputting the emotional speech that is synthesized from the input text sentence; and
displaying the input text sentence at the same speech as the speaker output the emotional speech.

2. The method of claim 1, wherein the recognizing of the sentence includes analyzing the recognized sentence and converting the recognized sentence into phonemes according to a linguistic feature.

3. A mobile terminal comprising:
a key configured to input a control command for synthesizing an emotional speech;
a memory configured to store an emotion word dictionary in which each of the words is classified as an entry having multiple pre-defined emotions;
a controller configured to:
receive at least one sentence comprising words that is input as text, based on the control command,
calculate a probability vector of the multiple pre-defined emotions for each of the words that makes up the recognized sentence, the probability vector means a value of frequency of usage of each of the multiple pre-defined emotions for each of the words in a database (DB) environment, wherein the probability vector of the multiple pre-defined emotions is updated to reflect the result of learning that is obtained through calculations of the probability vector,
apply a weight of the probability vector of the multiple pre-defined emotions of each of the words that are used in a real environment,
adjust a final value of the probability vector based on context information on the recognized sentence,
estimate an emotion and a rhythm of each of the words,
generate one integration emotion rhythm model based on the estimated rhythm and the context information, wherein the one integration emotion rhythm model estimates one integration rhythm based on the context information on the recognized sentence without estimating a separate rhythm for the emotion of each word, calculate in stages degrees of similarity in an emotion and a rhythm between adjacent words of the recognized sentence based on the estimated emotion and the generated integration emotion rhythm model, apply a different weight to all phoneme candidates corresponding to each of the words based on the degrees of the similarity in the estimated emotion and the estimated rhythm and the final value of the probability vector, select one phoneme having a pitch contour that has a minimum distance value from a target pitch contour, among all the phoneme candidates to which the different weight is applied through a Viterbi search that is based on a cost function, and synthesize the emotional speech that corresponds to the recognized sentence in optimal units by connecting the selected phoneme candidate for each of the words;

a speaker configured to output the emotional speech that is synthesized from the input text sentence; and a display configured to display the input text sentence at the same speed as the speaker outputs the emotional speech.

4. The mobile terminal of claim 3, wherein the controller analyzes the received sentence and converts the received sentence into phonemes according to a linguistic feature.

5. The mobile terminal of claim 3, wherein the context information includes at least one or more among sentence division-reading information, part-of-speech information, and sentence structure information.

* * * * *